United States Patent [19]
Jones

[11] 3,873,441
[45] Mar. 25, 1975

[54] CATALYST TRANSFER METHOD FOR MOVING-BED REACTORS

[75] Inventor: Evan A. Jones, Mt. Prospect, Ill.

[73] Assignee: Universal Oil Products Company, Des Plaines, Ill.

[22] Filed: Sept. 6, 1973

[21] Appl. No.: 394,871

[52] U.S. Cl............... 208/166, 23/288 G, 23/289, 208/171, 208/173, 214/17 B
[51] Int. Cl............................................ C10g 35/10
[58] Field of Search .......... 208/152, 166, 171, 173; 214/17 B

[56] References Cited
UNITED STATES PATENTS

| | | | |
|---|---|---|---|
| 2,985,324 | 5/1961 | Balentine | 214/17 B |
| 3,729,105 | 4/1973 | Huebler et al. | 214/17 B |
| 3,730,880 | 5/1973 | Toorn et al. | 208/213 |
| 3,785,963 | 1/1974 | Boyd et al. | 208/173 |
| 3,795,607 | 3/1974 | Adams et al. | 208/251 H |

Primary Examiner—Herbert Levine
Attorney, Agent, or Firm—James R. Hoatson, Jr.; Robert W. Erickson; William H. Page, II

[57] ABSTRACT

Catalyst is transferred to and from a relatively high pressure moving-bed reactor through pressurized, liquid filled lock hoppers. A vertically segmented lock hopper is first filled with liquid and then raised to the pressure of the reactor and communicated with the reactor to allow equal portions of catalyst to slowly settle into each section of the lock hopper. Rapidly flowing liquid is then passed into the reactor to prevent catalyst from passing from the reactor while the lock hopper is emptied. The transfer method is used on reactors processing a heavy residual oil and the lock hoppers are pressurized with a lighter oil. Advantages include gentle catalyst transfer, ease of lock hopper pressurization and partial washing of the withdrawn catalyst.

14 Claims, 3 Drawing Figures

3,873,441

CATALYST TRANSFER METHOD FOR MOVING-BED REACTORS

BACKGROUND OF THE INVENTION

1. Field of the Invention

The invention pertains to the catalytic treatment of heavy mineral oils in a moving-bed reactor. More particularly, the invention pertains to the addition and withdrawal of solid catalyst in relatively high pressure moving-bed reactor processes having liquid or mixed-phase reactants.

2. Prior Art

Moving-bed reactor systems are well established in the art as demonstrated by U.S. Pat. No. 2,303,717 which shows the use, regeneration and transfer of catalyst in such a system. U.S. Pat. No. 2,893,945 discloses the practice of vapor phase reforming and hydroprocessing operations in separate zones within the same reaction vessel. Contemporary usage has focused on the continuous low pressure naphtha reforming operations exemplified by U.S. Pat. Nos. 3,725,248 and 3,647,680. These latter references disclose the use of an upward gas flow through small diameter conduits as a valve means to prevent catalyst flow out of a reaction vessel. U.S. Pat. No. 2,985,324 persents a method of withdrawing newly formed catalyst from a liquid filled pressure vessel and also uses liquid flow to control the descent of catalyst.

BRIEF SUMMARY OF THE INVENTION

Transferring catalyst into and out of a moving-bed reactor may be accomplished in a more facile manner by the use of liquid filled lock hoppers and a liquid filled segmented catalyst collection hopper during pressurization and transfer steps. Catalyst attrition and wear on equipment is minimized by the slower catalyst movement which results. Catalyst is uniformly withdrawn from different areas of the reactor, and hydrogen consumption is reduced. A relatively light and cold hydrocarbon stream is passed upward into the reaction zone from the catalyst collection hopper to control catalyst flow from the reaction zone, to cool the catalyst, and to flush heavy liquid reactants from the withdrawn catalyst. The lack of any discharge of reactants into the lock hopper eliminates perturbations in downstream separatory steps by changing reactor effluent flow rates.

Figure 1:
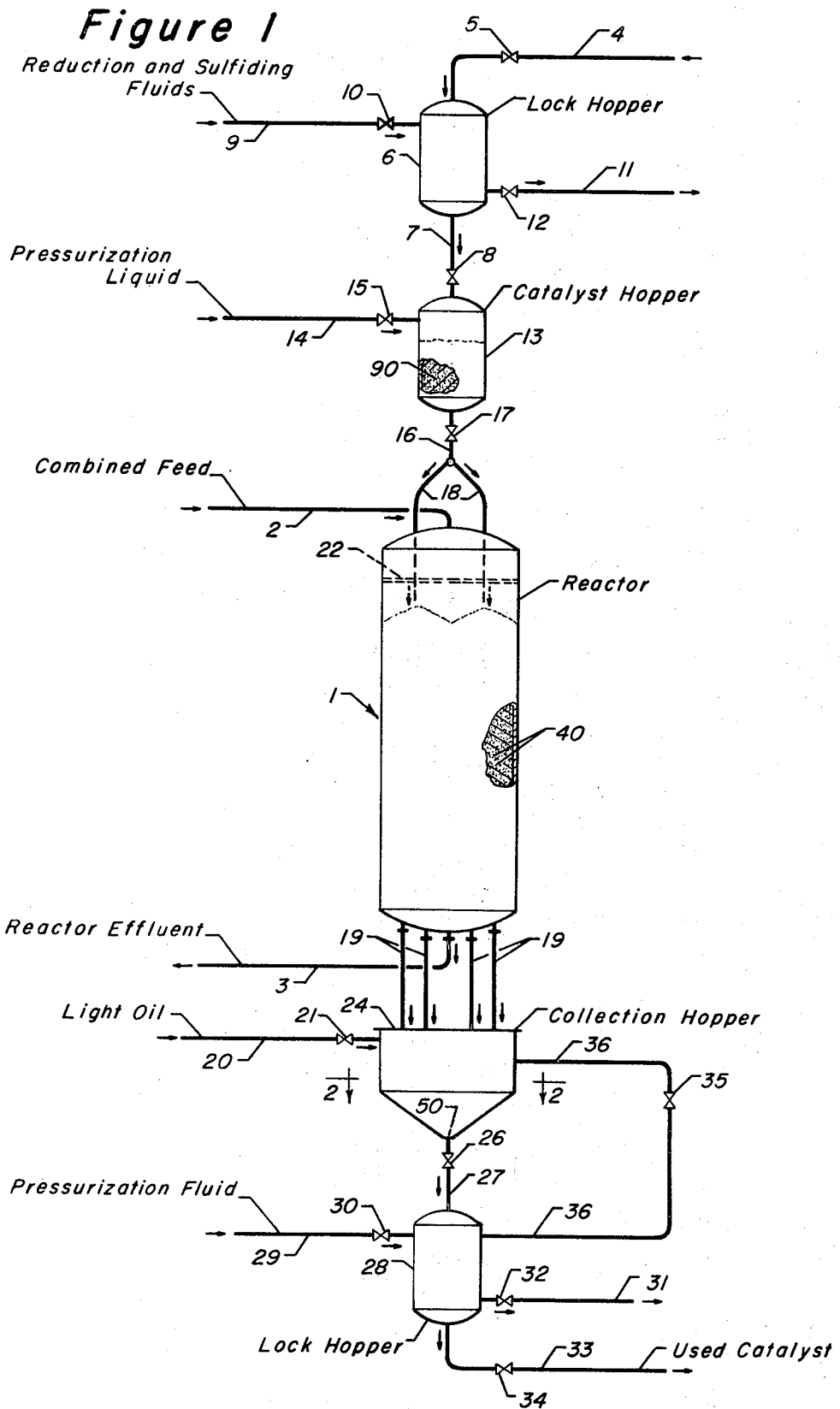
FIG. 1 presents details of the flows in and through the moving-bed reaction zone.

The preferred reactant stream is a mixture of a partially vaporized hydrocarbon charge stream, such as crude column bottoms, and hydrogen which passes through line 2 and enters an upper portion of the reaction vessel 1. The mixed-phase reactants pass downward through a flow distribution means such as distributor 22 and fall upon a solid bed of catalyst 40. The reactants pass downward through this bed of catalyst and exit from a bottom portion of the reaction vessel through line 3. The catalyst entering the reaction zone first passes through line 4 in quantities controlled by valve 5. It is collected in the lock hopper 6, in which it is purged, reduced and sulfided as may be required. These operations are performed using suitable fluids which enter through line 9 at a rate controlled by valve 10 and exit through line 11 at a rate controlled by valve 12. The purging is accomplished with a liquid but the reduction step will typically be conducted using a hydrogen-rich gas stream. The sulfiding step may be conducted with either a gaseous or liquid stream which contains a relatively small amount of sulfur and has been preheated to an above ambient temperature.

The conditioned catalyst is then passed through line 7 by opening positive sealing valve means 8 and allowing it to descend to a second lock hopper 13. It is preferred that both the upper and lower vessels are liquid filled. This catalyst flow may be strictly by gravity or may be aided by the flow of a liquid stream from the first lock hopper to the second lock hopper caused by a slight pressure differential between them. Second lock hopper 13 serves as a pressurization vessel and catalyst reservoir wherein the catalyst is raised to the pressure of the reaction zone by a pressurization liquid which enters through line 14 at a rate controlled by valve 15. Positive sealing valve means 17 in line 16 connected to the lower portion of this second lock hopper, referred to herein as the catalyst hopper, is then opened, and catalyst flows downward through a plurality of catalyst transfer conduits 18. The catalyst forms a conical pile below the opening of the catalyst transfer conduits, which eventually rises to the opening and prevents further catalyst flow. In the preferred mode of operation, valve means 17 will therefore be opened for extended periods of time and catalyst transfer conduits 18 and the catalyst hopper 13 will be filled with catalyst until all the catalyst has been removed from the catalyst hopper 13. Preferably, this will take about one day as the catalyst hopper will contain a much larger quantity of catalyst than is periodically withdrawn through the bottom of the reaction vessel. This reservoir of catalyst is depicted by catalyst bed 90.

At the bottom of reaction vessel 1, a plurality of catalyst transfer conduits 19 are evenly spaced across the cross-sectional area of the reaction vessel to provide a uniform withdrawal of catalyst, and therefore a horizontally uniform flow of catalyst downward through the reaction vessel in a plug flow manner. With a single withdrawal conduit, the catalyst tends to channel and a wide range of catalyst residence times results. The catalyst transfer conduits connect to a vertically segmented catalyst collection hopper 24. As will be hereinafter described, the vertical segments effect the removal of equal portions of catalyst through each catalyst withdrawal conduit. A relatively light and cold wash oil enters the catalyst collection hopper through line 20 at a rate controlled by valve 21 and passes upward through the catalyst withdrawal conduits 19. The rate of flow of this light oil through the catalyst withdrawal conduits is used to regulate the flow of catalyst downward. Periodically, this rate is increased to a value sufficient to prevent the downward flow of catalyst from the reaction vessel. At these points in time, catalyst is removed from the catalyst collection hopper 24 through line 27 by opening positive sealing valve means 26 and allowing the catalyst to settle downward through opening 50.

This catalyst is transferred into a third lock hopper 28 which has been pressurized by a liquid hydrocarbon stream which entered through line 29 at a rate controlled by valve 30. Prior to opening valve means 26, the pressures of the catalyst collection hopper and the third lock hopper are equalized by opening positive sealing valve means 35 in pressure equalization line 36. This is a small diameter line which is not intended for catalyst flow. It is only opened prior to and during catalyst transfer to remove any hydrostatic pressure differential between the two vessels. Valve means 26 and valve means 35 are closed when catalyst transfer has been completed. Lock hopper 28 may then be depressured through line 31 by opening valve 32 and the catalyst may be flushed and cooled with additional quantity of light hydrocarbons entering through line 29. The used catalyst is then withdrawn from the moving-bed reaction zone through line 33 by opening valve 34.

Figure 2:
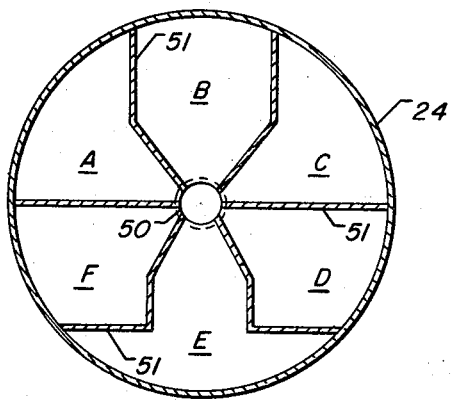
FIG. 2 is the view as seen looking downward from the section line across the catalyst collection hopper 24.

FIG. 2 is presented to clarify what is meant by a vertically segmented catalyst collection hopper. It depicts the cylindrical collection hopper 24 which has been divided into a number of vertical sections or segments labeled A, B, C, D, E and F by a cross hatch pattern of vertical baffles 51. This design is intended to give each section an equal volumetric fraction of the total space within the catalyst collection hopper 24. An equal number of the catalyst withdrawal tubes 19 leads to each one of these vertical segments. The withdrawn catalyst accumulates in each segment until it rises to the bottom of the catalyst withdrawal tube. Since there is no more available space, the flow of catalyst through this catalyst withdrawal ceases. In this way, an equal quantity of catalyst is withdrawn in each catalyst withdrawal conduits. When valve 26 is opened, the catalyst contained within the catalyst collection hopper will pass through opening 50 which is connected to line 27 leading from the third lock hopper.

Figure 3:
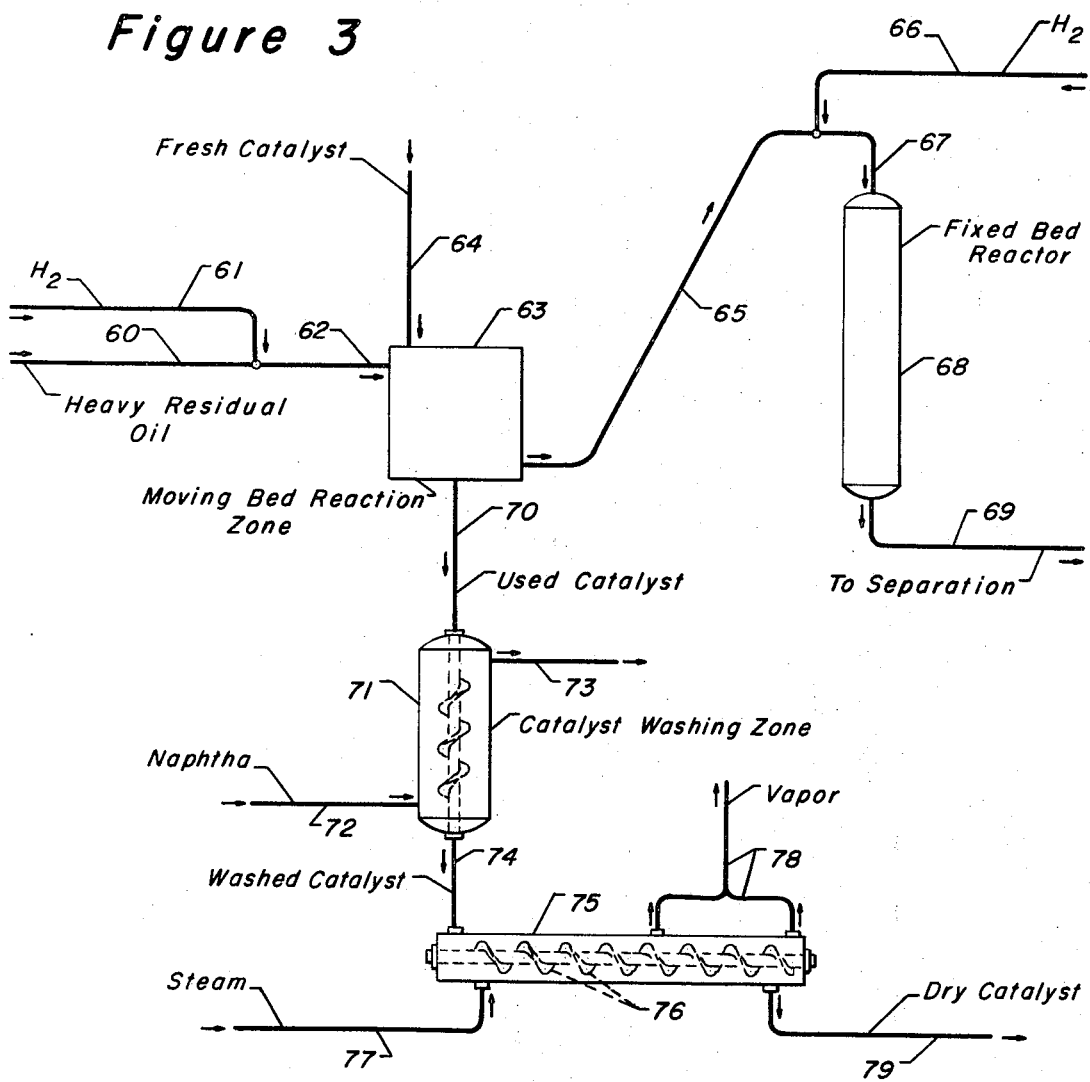
FIG. 3 shows the interrelationship of the moving-bed reaction zone with other processing elements and catalyst treatment equipment.

FIG. 3 shows the interrelationship of the moving-bed reaction zone with other components which are preferably connected to it. The moving-bed reaction zone 63 is indicated schematically by a box which does not show the multitude of lock hoppers and lines presented in the detailed description of FIG. 1. A heavy residual oil is shown entering by line 60 and being admixed with a hydrogencontaining gas entering by line 61. The resulting reactant mixture enters by line 62 and moves downward through the moving-bed reaction zone in which the residual oil is hydroprocessed for the removal of metals, sulfur and nitrogen and may be partially hydrocracked to a lighter oil fraction.

The effluent from the moving-bed reaction zone leaves by line 65 and is preferably mixed with additional hydrogen entering by line 66 to increase the hydrogen partial pressure of this new reactant mixture prior to passage by line 67 into a fixed-bed reactor 68. Typically, the material passing through line 65 is heat-exchanged to recover some of the net heat of reaction produced in moving-bed reaction zone 63 and passed through a separation zone before entering the fixed-bed reactor. In reaction 68, the moving-bed reaction zone effluent stream is subjected to further hydroprocessing for the removal of additional amounts of sulfur and other impurities. The effluent stream of the fixed-bed reactor leaves by line 69 for passage to a separation zone such as a fractionator.

Fresh catalyst will enter the moving-bed reaction zone 63 through transfer line 64, which is the equivalent of line 4 of FIG. 1. While contained in the moving-bed reaction zone, catalyst will accumulate a very high concentration of metals such as nickel and vanadium. These deposited metals reduce the catalyst's activity and unfortunately are not removed in the normal carbon burn off regeneration procedure. The used metal-contaminated catalyst passes out of the moving-bed reaction zone through line 70 and enters a washing zone 71 wherein it is countercurrently contacted with a relatively volatile solvent such as a naphtha. The solvent enters by line 72 and exits by line 73 carrying heavy hydrocarbon material removed from the surface of the catalyst. The solvent washing zone is depicted as containing a rotating helical extractor which promotes the washing of the catalyst as it flows downward.

The washed catalyst is withdrawn through a rotary feeder in line 74 and enters a drying zone 75. This method of separating the catalyst from the solvent is not depicted in this simplified drawing. Preferably, a rotating inclined screw conveyor would be utilized to lift the catalyst out of the solvent. In the drying zone, the washed catalyst is transferred horizontally by a rotating screw conveyor means 76. The catalyst is first subjected to stripping by stream entering through line 77 and is then subjected to heating and drying which produces a vapor removed through vapor collection system 78. A cooling gas may also be charged into the drying zone to cool the catalyst before it is removed through line 79 for disposal or metals recovery.

For the purposes of simplicity and clarity of presentation of the inventive concept, these drawings do not include the required flow and temperature indicators and control systems. Such systems and the design of suitable vessels and lines by the applicable safety codes are within the expertise of those skilled in the arts of hydrocarbon processing. The presentation of only one vessel configuration is not intended to remove obvious modifications from the scope of the appended claims, since the inventive concept resides in a method of operation and not in the specific apparatus used. Representative modifications of the apparatus such as the use of a radial flow reactor, an increase in the number of lock hoppers used or a different placement of the catalyst transfer lines are anticipated for the adaptation of the subject catalyst transfer method to various hydrocarbon conversion processes.

DETAILED DESCRIPTION

Despite the great advances which have been made in the art of catalysis, the eventual deactivation of the catalysts used in hydrocarbon conversion processing is a certainty. To counteract this, there have been developed moving-bed processes in which fresh or regenerated catalyst is intermittently added to the reaction vessel and a corresponding amount of used catalyst is withdrawn. These processes have several economic advantages as they eliminate the necessity to shut down the processing unit for the replacement or regeneration of the catalyst and also allow the continuous production of a uniform product. Other advantages include a smaller reactor and often a lower operating pressure. By the term "moving-bed reactor" is meant a reaction vessel through which a dense bed of nonfluidized solid catalyst is transferred downward by the action of gravity. Such a system is described in U.S. Pat. No. 3,647,680.

In many typical vapor phase processes such as reforming, the catalyst is deactivated mainly by the deposition of a layer of carbon. In other processes, deactivation is caused by catalytic of the catalyst structure or poisoning of active catalystic sites by sulfur or metals. The problems of catalyst deactivation is especially pressing in black oil conversion or residual crude desulfurization processes because a high concentration of such metals as vanadium and nickel is encountered. Deactivation of conventional catalysts by these metals is irreversible, and only minimal improvement in catalyst activity results from the customary carbon burning regeneration. Many imported crude oils and the oils produced from tar sands have a very high metals content, and these metals become concentrated in the crude column bottoms which is then charged to a desulfurization reactor. Another problem of processing these heavy materials is their increased tendency to contain scale and particulate matter which forms a crust on the top of the catalyst bed and thereby increases the pressure drop through the reactor and gives maldistribution of the liquid phase. Typical heavy residual oil materials include the above-mentioned crude column bottoms and various streams derived from the main column bottoms by further fractionation, such as a vacuum gas oil. Portions of these materials cannot be vaporized and therefore the hydrocarbonhydrogen reactant mixture passing through the reaction zone will be mixed-phase.

The processing of such residual oils is performed at an elevated pressure of from about 300 psig. to about 4,000 psig. Lower pressures are desirable because of mechanical design considerations, but higher pressures allow increased hydrogen concentrations and hydrogen dissolution into the oil and hence are desirable from a processing standpoint. The operating pressure has a direct relation to useful catalyst life or stability, and the optimum pressure is usually considered to correspond to how heavy the material being processed is. Therefore, a typical fixedbed hydrotreating unit charging these residual oils would operate above 2,000 psig. On the other hand, a moving-bed system is freed of the constraint of a fixed catalyst life but is faced with the problems associated with catalyst transfer. For these reasons, the preferred operating pressure of such moving-bed processes has been below 1,000 psig.

The usage of elevated pressures requires a very efficient positive sealing valve means between different vessels. For instance, the lock hopper in which the catalyst is purged, reduced and sulfided must be isolated from the reaction zone when it has a high oxygen concentration or is at a reduced pressure. These valve means may be of any design but must be capable of withstanding the abrasion caused by the passage of solid catalyst over valve seats, etc. If the valve means between two vessels is quickly opened, that is the vessels are communicated, while there is a pressure differential between them, small pieces of dust or catalyst chips will be quickly swept through the valve means and cause further erosion of the valve means. Experience with moving-bed reforming units has indicated that surprisingly the worst erosion of the valves occurs not on the valves through which the catalyst is transferred from one vessel to another but on the valves used to depressurize the vessels. It is theorized that this is caused by small pieces of catalyst and dust which rust through the valve at the exceedingly high velocities produced by the pressure differentials present across the valve. This problem may be expected to increase as higher pressures are used for heavy oil hydrotreating.

These small catalyst chips may enter the process with the charged catalyst during loading or may be generated in situ by movement within the reactor. Thus, they may be formed by abrasion as the catalyst bed moves or by impact with the inner surfaces of the reaction zone or other catalyst. For instance, catalyst released when valve 8 in FIG. 1 is opened will be free to fall a considerable distance and accelerate to a rapid velocity before striking the bottom of catalyst hopper 13.

It is an object of my invention to provide an improved hydrotreating process for such heavy residual materials. It is also an object of my invention to provide an improved method of transferring catalyst between the vessels used in a high pressure, moving-bed hydrocarbon conversion process and to reduce catalyst attrition and valve wear. This new method can be used at pressures well above the 1,000 psig. level previously mentioned. It is still a further object to provide a process for hydroprocessing high metal content residual oils continuously and safely in a moving-bed reaction zone.

In accordance with these objectives, the preferred method utilized to withdraw catalyst from a reaction vessel in accordance with my invention comprises the steps of: (a) passing a quantity of catalyst downward from said reaction zone through each of a plurality of conduits into a liquid filled, vertically segmented catalyst collection hopper: (b) passing a liquid hydrocarbon stream upward through each of said conduits and into said reaction zone at a rate sufficient to prevent the further passage of catalyst downward through said conduits; (c) equalizing the hydrostatic pressure in the liquid filled catalyst collection hopper and in a liquid filled lock hopper means, and communicating the catalyst collection hopper and lock hopper means through a catalyst transfer conduit having a positive sealing valve means and effecting the transfer of catalyst contained within the catalyst collection hopper into the lock hopper means; (d) closing said positive sealing valve means and isolating the lock hopper means from the catalyst collection hopper; and, (e) reducing the flow rate of said liquid hydrocarbon stream through said conduits to effect the passage of additional quantities of catalyst into the segmented catalyst collection hopper.

From this description, it is apparent that the use of a vertically segmented catalyst collection hopper is preferred in the practice of my process. By the term "vertically segmented catalyst collection hopper" is meant a catalyst receiving vessel having a plurality of openings providing communication between a source of catalyst and vertical sections within the receiving vessel. Preferably each vertical section is equal in volume and connects with an equal number of catalyst conduits which convey catalyst from the bottom of the reaction vessel. One configuration is shown by the vertical walls 51 of FIG. 2. Another possible design would be similar to a halved grapefruit with the vertical baffles radiating outward from the center. The catalyst collection hopper serves as a means to withdraw equal portions of catalyst from different parts of the reactor and thereby assure a uniform plug-like settling of the catalyst mass within the reaction vessel and uniform catalyst usage. Its operation is based on the principle that once a vertical section has filled with catalyst, there will be no further flow into that section although other sections filling at slower rates are uneffected. Uneven flow rates through different catalyst withdrawal conduits are therefore not a problem since the flow is simply allowed to continue until each section is filled rather than attempting to time the opening of individual valves on each conduit.

As indicated in FIG. 1, no physical valve means need be located in the catalyst conduits between the reaction vessel and the catalyst collection hopper. The flow of catalyst into the hopper will stop when it is full. At those times when it is desired to empty catalyst from the collection hopper, a liquid hydrocarbon stream is passed into the collection hopper and upward through the catalyst withdrawal conduits at such a high rate that the catalyst does not descend. The catalyst collection hopper will be liquid filled during catalyst accumulation and removal periods and the lock hopper into which the catalyst collection hopper empties will be liquid filled at least during those periods when catalyst is transferred into it. The use of a liquid in these vessels is therefore an essential element in the accomplishment of the objectives set out above.

The liquid functions to provide a uniform single phase between the vessels between which the catalyst is transferred. Its presence serves as a viscous flow damping means to lessen extremely rapid catalyst movement which may injure the catalyst or erode the mechanical equipment. Catalyst falling from lock hopper 6 will therefore be traveling at a much lower velocity when it strikes catalyst hopper 13, and dust forming catalyst attrition will be reduced. Another advantage to the use of a liquid is the ease and rapidity with which the pressure of a liquid filled vessel may be changed as compared to a gas filled vessel. The flow through the valve means of fluids containing the catalyst pieces is in this manner reduced in quantity, velocity and catalyst content. Still another advantage of using liquid filled lock hoppers resides in the greater difficulty of providing a positive seal for hydrogen as compared to a liquid. It is therefore seen that the subject catalyst transfer methods not only reduce the wear of the valve means used, but also reduce, albeit slightly, the quality of the seal required in the valve means used.

The subject liquid phase catalyst withdrawal method may be used on a vapor phase operation, but it is especially suited for use on a mixed-phase operation. If the catalyst collection hopper or the lock hopper was communicated with the bottom of the reaction vessel while the hopper was full of vapor, the liquid phase material exiting the bottom of reaction vessel would quickly drain into the hopper. This in turn would change the quantity and composition of the material entering the separation steps downstream of the reaction vessel. This perturbation of the vapor-liquid separators and fractionators does not occur with a liquid filled lock hopper as used in this catalyst transfer method. In addition, the hydrocarbon flow used as a catalyst valve means is started and stopped in a gradual manner and may be a liquid chosen to minimize the effects of the increased effluent flow rate.

Preferably, the liquid charged into the lower lock hoppers and the segmented catalyst collection hopper will be a relatively light and cold stream as compared to the material being processed. That is to say, the lower lock hopper and catalyst collection vessel will be pressurized up to the process pressure with a material such as a light cycle oil. When such cold light materials are used, they will actually have a greater specific gravity than the "heavy" hydrocarbon being processed. For example, a cold light gas oil may have a specific gravity of 0.75 to about 0.80, whereas the hot heavy oil being processed may have a specific gravity of about 0.6. The cold pressurization liquid will therefore tend to stay in the lower vessel, and the hot heavy oil will tend to remain in the reaction vessel. This method will perform a beneficial stripping and cooling action on any downward falling catalyst and reduce the mixing of the two materials.

The liquid charged upwardly into the catalyst withdrawal conduits will also be a relatively light liquid. To avoid possible thermal stresses, it should however not be exceedingly cold if it enters at a high rate. Experience has shown a high liquid rate is not required to prevent catalyst flow and this should not be a major problem. Preferably, the liquid used in these steps will be free flowing at room temperature but heavier than a naphtha. Thus, the relatively light hydrocarbon stream may be a light or heavy cycle oil. To limit the amount of pumping required, this light liquid may be obtained from a section of the process having a high pressure and containing relatively light products. That is to say, a suitable liquid could be obtained from the cold high pressure separator normally used on these processes and operated at substantially the same pressure as the reactor.

The catalyst collection hopper will always be at substantially the same pressure as the reaction vessel since they are in open communication through the catalyst withdrawal conduits. The other lock hoppers will at times be at decreased pressures and are therefore separated by a positive shut-off valve means. When catalyst is being transferred, the lock hoppers will be pumped up to the pressure of the vessel they will be communicated with. Small errors in pressure gauges are not uncommon, and as a step in the practice of this catalyst transfer the pressure equalization step may be completed by connecting the two vessels through a small pressure equalization line such as line 36 of FIG. 1. Normally, this line is closed to fluid flow by a positive sealing valve means and has a screen over its openings into the two vessels to prevent catalyst from flowing through it. Similar lines may be provided connecting catalyst hopper 13 with the upper portion of reaction vessel 1.

It is preferred that the catalyst is fed to the reaction vessel from a relatively large volume catalyst hopper located above the reaction vessel, as represented by the catalyst hopper 13 in FIG. 1. This vessel is capable of holding an amount of catalyst equivalent to the total amount transferred into the reaction zone during one or more days. The catalyst is loaded from a lock hopper above and then pressurized with a liquid up to the pressure of the reaction vessel 1. The equivalent of valve 17 in line 16 is then opened and catalyst flows into the reaction zone. In the preferred mode of operation, not all of the catalyst contained in the catalyst hopper 13 is required within the reaction zone and at least a portion of the catalyst remains within the catalyst hopper 13. This is indicated by the catalyst bed 90 in FIG. 1. As an example of the relative amounts of catalyst preferred, if the rate of catalyst withdrawal from the reaction zone is 200 pounds per hour, then the catalyst hopper 13 would be capable of holding 4,800 pounds or more of catalyst. Nevertheless, smaller quantities may be used, and the phrase "relatively large amount of catalyst, as compared to said quantities of used hydrotreating catalyst sequentially passed from the lower portion of the reaction vessel," is intended to designate any quantity greater than five times that removed in each sequential catalyst withdrawal step. As already stated, this relatively large amount is preferably equal to one or more days catalyst turnover. A nuclear level sensing device may be used in lines 16 or 18 to indicate when catalyst hopper 13 needs refilling.

It is seen that by the usage of the preferred system and method, it is only necessary to manipulate valve means 17 about once every day. This by itself simplifies operation of the process. The number of purging and pressurization steps required in any time period is also reduced. It also means the majority of the catalyst transfer through the valve means 17 will be at a low velocity and hence less likely to erode exposed sealing surfaces of the valve means. This more facile method of transferring catalyst into a high pressure hydrocarbon conversion process is in accord with those objectives previously set out.

A hydrotreating process utilizing these methods of catalyst addition and catalyst withdrawal may now be described as a process comprising the steps of: (a) passing a hydrocarbon charge stream into an upper portion of a reaction vessel maintained at reaction conditions in admixture with hydrogen; (b) withdrawing an effluent stream from a lower portion of said reaction vessel; (c) passing quantities of used hydroprocessing catalyst downward from the lower portion of said reaction vessel into a liquid filled vertically segmented catalyst collection hopper through a plurality of catalyst withdrawal conduits, the catalyst collection hopper being filled with a relatively light liquid hydrocarbon stream as compared to said effluent stream; (d) passing a liquid hydrocarbon stream upward through each of said conduits and into said reaction vessel at a rate sufficient to prevent the further passage of catalyst downward through said catalyst withdrawal conduits, and equalizing the hydrostatic pressure in the liquid filled catalyst collection hopper and in a liquid filled lock hopper means; (e) communicating the catalyst collection hopper and said lock hopper means through a catalyst transfer conduit having a positive sealing valve means to effect the transferring of the catalyst contained within the catalyst collection hopper into the lock hopper means; (f) closing said positive sealing valve means and isolating the lock hopper means from the catalyst collection hopper; (g) reducing the flow rate of said liquid hydrocarbon stream through said conduits to effect the passage of additional quantities of catalyst into the segmented catalyst collection hopper; and, (h) effecting the transfer of catalyst into said reaction vessel by first transferring a relatively large amount of catalyst, as compared to said quantities of used hydroprocessing catalyst sequentially passed from the lower portion of the reaction vessel, into a catalyst feed hopper located above the reaction vessel and isolated from the reaction vessel by a positive sealing valve means, and then opening said positive sealing valve means to allow passage of the catalyst into the reaction vessel until said relatively large amount of catalyst has emptied from the catalyst feed hopper.

As previously stated, it is a method of catalyst transfer that is described and not a processing unit configuration. Terms referring to various parts of a processing unit used in this description are therefore not intended to unduly limit interpretation of this description. For instance, the term "upper portion" refers broadly to any locus on a reaction vessel located above the vertical midpoint of the vessel. Likewise, the term "lower portion" refers to any place below that point. Preferably however, these terms refer to areas near the extremities of the vessel similar to those locations indicated in FIG. 1. The term "hydroprocessing" is intended to be interpreted as covering those operations described in FIGS. 1 and 2 on page 174 of the Oct. 7, 1968 issue of The Oil and Gas Journal.

The catalyst charged into the catalyst hopper which feeds the reaction vessel is purged of oxygen and as needed, reduced and sulfided in a separate lock hopper which may be located above the catalyst hopper 3 as shown in FIG. 1. These catalyst preparation steps are similar to those performed in the startup procedure for a fixedbed hydrotreating process. The details on one such suitable procedure are given in U.S. Pat. No. 3,642,613. Application of the subject liquid phase catalyst transfer techniques at this point has an added advantage. This is the displacement of any gaseous materials from the upper lock hoppers by the liquid used to pressurize the catalyst. For this reason and others previously given, this optional catalyst preparation step is preferred. The hydrocarbon material used is either withdrawn through line 14 or discharged into the reaction vessel. The liquid hydrocarbon in lock hopper 13 also serves to purge the lock hopper of light gases by displacement through a line not shown. This is advantageous when it is desired to limit the amount of these light gases entering lock hopper 6. In this case, a stripped hydrocarbon would be used.

The composition of the catalyst used in this process is not a limiting factor. It may be any commercially available hydroprocessing catalyst. These catalysts are normally formed as a sphere by an oil drop method as demonstrated in U.S. Pat. No. 2,774,743 or extruded or pelleted. Basic to the manufacture of nearly all these catalysts is the inclusion of a metal of Group VIII of the Periodic Table on an inorganic oxide carrier by coprecipitation or impregnation. The more commonly used metals from this group are iron, cobalt, nickel, platinum and palladium. Additional metals from Group VI-A such as chromium, molybdenum or tungsten are also often added. The carrier material may be either natural or synthetic and predominantly includes about 10 to 50 percent silica with the remainder being alumina. It may also be an all alumina base. Such formulations and manufacturing techniques are voluminous and well known to those skilled in the art. A more detailed listing of suitable catalyst compositions may be obtained by reference to U.S. Pat. Nos. 3,203,889; 3,254,018; 3,525,684 and 3,471,399.

The reaction conditions necessary for any hydroprocessing operation are determined by the charge stock, the catalyst used and the desired result of the process. A broad range of conditions includes a temperature of from 500°F. to 1,000°F., a pressure of from 300 psig. to 4000 psig., and a liquid hourly space velocity of 0.1 to about 3.0. The liquid hourly space velocity is defined as the hourly volume at 60°F. of the hydrocarbon charged to the reactor divided by the volume in the catalyst in the reactor. The exact reactor temperature required is determined by the initial activity and prior use of catalyst. More specific examples of reaction conditions are contained in the above-listed U.S. Patents. As a general rule, the preferred operating pressure will increase with the boiling point of the material being processed.

In all hydroprocessing operations, hydrogen is circulated through the process at a rate of about 1000 to about 25,000 scf./Bbl. of charge material. This is to increase the partial pressure of hydrogen, thereby resulting in better catalyst stability and to provide the hydrogen needed for the formation of ammonia and hydrogen sulfide from the nitrogen and sulfur removed from the charge stock and also for the saturation of olefinic hydrocarbons formed by the cracking of large complex molecules. Hydrogen consumed in this manner must be replaced at a rate equal to its consumption, which will vary from about 10 scf./Bbl. to about 600 scf./Bbl. during hydrotreating and up to about 3,000 scf./Bbl. during hydrocracking. The production of hydrogen sulfide and ammonia makes it necessary to in some manner remove these compounds from the process on a continuous basis. One procedure to accomplish this is the injection of water into the reactor effluent to dissolve the salts formed from these impurities followed by sufficient cooling of the effluent to form a water phase which is then decanted from a separation vessel. A second method is the treatment of the recycled hydrogen gas stream with a caustic or amine solution to scrub out the $H_2S$ as described in U.S. Pat. No. 3,725,252. The reactor effluent is normally cooled and separated to recover the majority of the hydrogen for recirculation and the condensed hydrocarbons are then fractionated into the desired products. The performance of these operations is well known to those skilled in the art. One example of such an effluent treatment process is given in U.S. Pat. No. 3,402,122.

The oil-covered catalyst removed from the bottom of the reaction vessel must be cleaned before it may be safely stored or transported by conventional methods such as steel drums because the volatile hydrocarbons, sulfur and metals contained in this material make it very susceptible to ignition. Often used catalyst is disposed of as landfill. However, when high metal content residual oils are processed, the metal content of the catalyst may be as high as 35 weight percent. As the metal content increases, the economic advantages of recovering the original and deposited metals such as nickel and vanadium also increases. To condition the catalyst for safe handling and for metal recovery operations, it is first depressured in a lock hopper following the segmented catalyst collection hopper. It is then passed into a washing zone wherein it is contacted with a volatile solvent such as a naphtha to remove any oil residue. Following this, the catalyst is transferred to a drying zone for removal of the solvent by stripping with steam and heating. As illustrated in FIG. 3, it is preferred that the washing zone comprise a helical rotor within a solvent holding tank which turns over the catalyst as it descends countercurrent to a solvent stream. The catalyst is then drained and placed in a rotating kiln wherein it is first stripped with high pressure steam and then heated for drying. The vapors produced are collected and the solvent is recovered for reuse.

I claim as my invention:

1. A process for withdrawing solid catalyst from a pressurized, mixed-phase hydroprocessing reaction zone which comprises the steps of:
   a. passing a quantity of catalyst downward from said reaction zone through each of a plurality of conduits into a liquid filled, vertically segmented catalyst collection hopper, said collection hopper being filled with a relatively light liquid hydrocarbon stream as compared to said effluent stream;
   b. passing a liquid hydrocarbon stream upward through each of said conduits and into said reaction zone at a rate sufficient to prevent the further passage of catalyst downward through said conduits;
   c. equalizing the hydrostatic pressure in the liquid filled catalyst collection hopper and in a liquid filled lock hopper means, and communicating the catalyst collection hopper and lock hopper means through a catalyst transfer conduit having a positive sealing valve means and effecting the transfer of catalyst contained within the catalyst collection hopper into the lock hopper means;
   d. closing said positive sealing valve means and isolating the lock hopper means from the catalyst collection hopper; and,
   e. reducing the flow rate of said liquid hydrocarbon stream through said conduits to effect the passage of additional quantities of catalyst into the segmented catalyst collection hopper.

2. The catalyst withdrawal process of claim 1 further characterized in that the hydrostatic pressure of the catalyst collection hopper and lock hopper are equalized by pressurizing liquid contained in the lock hopper up to the pressure of the catalyst collection hopper.

3. The catalyst withdrawal process of claim 2 further characterized in that said catalyst collection hopper and said lock hopper are connected by a pressure equalization line having a normally closed positive sealing valve means, and said positive sealing valve means in the pressure equalization line is opened subsequent to the pressurizing of the liquid contained in the lock hopper and is closed prior to transferring the catalyst from the lock hopper.

4. A process for hydroprocessing a hydrocarbon charge stream which comprises the steps of:
   a. passing a hydrocarbon charge stream into an upper portion of a reaction vessel maintained at reaction conditions in admixture with hydrogen;
   b. withdrawing an effluent stream from a lower portion of said reaction vessel;
   c. passing quantities of used hydroprocessing catalyst downward from the lower portion of said reaction vessel into a liquid filled, vertically segmented catalyst collection hopper through a plurality of catalyst withdrawal conduits, the catalyst collection hopper being filled with a relatively light liquid hydrocarbon stream as compared to said effluent stream;
   d. passing a liquid hydrocarbon stream upward through each of said conduits and into said reaction vessel at a rate sufficient to prevent the further passage of catalyst downward through said catalyst withdrawal conduits, and equalizing the hydrostatic pressure in the liquid filled catalyst collection hopper and in a liquid filled lock hopper means;
   e. communicating the catalyst collection hopper and said lock hopper means through a catalyst transfer conduit having a positive sealing valve means to effect the transferring of catalyst contained within the catalyst collection hopper into the lock hopper means;

f. closing said positive sealing valve means and isolating the lock hopper means from the catalyst collection hopper;

g. reducing the flow rate of said liquid hydrocarbon stream through said conduits to effect the passage of additional quantities of catalyst into the segmented catalyst collection hopper; and, h. effecting the tranfer of catalyst into said reaction vessel by first transferring a relatively large amount of catalyst, as compared to said quantities of used hydroprocessing catalyst sequentially passed from the lower portion of the reaction vessel, into a catalyst feed hopper located above the reaction vessel and isolated from the reaction vessel by a positive sealing valve means, and then opening said positive sealing valve means to allow passage of the catalyst into the reaction vessel until said relatively large amount of catalyst has emptied from the catalyst feed hopper.

5. The process of claim 4 further characterized in that said catalyst feed hopper is filled with a liquid hydrocarbon before said relatively large amount of catalyst is transferred into said catalyst feed hopper.

6. The process of claim 5 further characterized in that said transferring of a relatively large amount of catalyst into said catalyst feed hopper comprises the steps of passing catalyst into a lock hopper separated from the catalyst feed hopper by a positive sealing valve means, and purging the catalyst in the lock hopper with a liquid.

7. The process of claim 5 further characterized in that said hydrocarbon charge stream comprises crude column bottoms.

8. The process of claim 5 further characterized in that said hydrocarbon charge stream comprises material derived by the further fractionation of crude column bottoms material.

9. A process for hydroprocessing a hydrocarbon charge stream which comprises the steps of:

a. passing said hydrocarbon charge stream into an upper portion of a reaction vessel maintained at reaction conditions in admixture with hydrogen;

b. withdrawing an effluent stream from a lower portion of said reaction vessel;

c. effecting the transfer of catalyst into said reaction vessel by first transferring a large amount of catalyst, as compared to the quantities of used hydroprocessing catalyst sequentially passed from the lower portion of the reaction vessel as hereinafter set out, into a catalyst feed hopper located above the reaction vessel and isolated from the reaction vessel by a positive sealing valve means while the catalyst feed hopper is at a pressure lower than the reaction vessel, then raising the pressure of catalyst feed hopper to the pressure of the reaction vessel while the catalyst feed hopper is filled with a liquid, and then opening said positive sealing valve means to allow passage of the catalyst into the reaction vessel;

d. passing quantities of used hydroprocessing catalyst downward from the lower portion of said reaction vessel into a vertically segmented catalyst collection hopper through a plurality of conduits;

e. passing a relatively light liquid hydrocarbon stream, as compared to said hydrocarbon charge stream, into said catalyst collection hopper and upwardly into said lower portion of the reaction vessel to effect the removal of hydroprocessed charge stream material from said hydroprocessing catalyst;

f. passing quantities of used hydroprocessing catalyst from the catalyst collection hopper into a liquid filled lock hopper; and, g. isolating said liquid filled lock hopper from the catalyst collection hopper by a second positive sealing valve means and reducing the pressure of said lock hopper to effect a depressurizing of the used hydroprocessing catalyst.

10. The process of claim 9 further characterized in that said hydrocarbon charge stream comprises crude column bottoms.

11. The process of claim 9 further characterized in that said hydrocarbon charge stream comprises material derived by the further fractionation of crude column bottoms material.

12. A process for hydroprocessing a hydrocarbon charge stream which comprises the steps of:

a. passing said hydrocarbon charge stream into an upper portion of a reaction vessel in admixture with hydrogen;

b. withdrawing an effluent stream from a lower portion of said reaction vessel;

c. passing quantities of solid hydroprocessing catalyst downward into said upper portion of said reaction vessel;

d. passing quantities of used hydroprocessing catalyst downward from the lower portion of said reaction vessel into a vertically segmented catalyst collection hopper through a plurality of conduits;

e. passing a relatively light liquid hydrocarbon stream, as compared to said hydrocarbon charge stream, into said lower portion of the reaction vessel to effect the removal of hydroprocessed charge stream material from said hydroprocessing catalyst, said light liquid hydrocarbon stream being passed into said catalyst collection hopper and then into said reaction vessel;

f. passing quantities of used hydroprocessing catalyst from the catalyst collection hopper into a liquid filled lock hopper;

g. isolating said liquid filled lock hopper from the catalyst collection hopper by a positive sealing valve means and reducing the pressure of said lock hopper to effect a depressurizing of the used hydroprocessing catalyst;

h. withdrawing depressurized catalyst from the lock hopper and transferring depressurized catalyst to a washing zone where the catalyst is contacted with a volatile solvent to effect a removal of heavy hydrocarbon material; and, i. transferring the catalyst to a drying zone for removal of solvent.

13. The process of claim 12 further characterized in that said hydrocarbon charge stream comprises crude column bottoms.

14. The process of claim 12 further characterized in that said hydrocarbon charge stream comprises material derived by the further fractionation of crude column bottoms material.

* * * * *